United States Patent [19]
Blum

[11] 3,784,164
[45] Jan. 8, 1974

[54] KNOCKDOWN WINCH ASSEMBLY FOR MOUNTING UPON A POWER DRIVEN VEHICLE WHEEL

[76] Inventor: Julius A. Blum, 5450 Vale Dr., Denver, Colo. 80222

[22] Filed: Oct. 20, 1972

[21] Appl. No.: 299,310

[52] U.S. Cl. .................................. 254/166, 242/95
[51] Int. Cl. .............................................. B66d 3/00
[58] Field of Search ................... 254/166, 162, 161; 242/95

[56] References Cited
UNITED STATES PATENTS
3,160,364  12/1964  Bailey .................................. 242/95

OTHER PUBLICATIONS
McCain Hub Winch Co. Publication, 6/10/66.

Primary Examiner—Evon C. Blunk
Assistant Examiner—James L. Rowland
Attorney—Ralph F. Crandell

[57] ABSTRACT

A knockdown type winch assembly for mounting upon a power driven vehicle wheel. The assembly includes two or more rigid rod members threaded at one end for mounting the rod members upon the vehicle wheel in place of the vehicle wheel retaining nuts or bolts. When mounted upon the wheel, the rod members project axially from the wheel at locations spaced generally symmetrically about the wheel axis. Longitudinally adjustable struts are then mounted between adjacent rod members to brace the members in their axially extending positions. When the struts and rod members are so assembled upon the wheel, the resulting assembly provides a reel structure fixed to the vehicle wheel upon which a winch cable may be wound upon driven rotation of the wheel.

4 Claims, 5 Drawing Figures

PATENTED JAN 8 1974   3,784,164

KNOCKDOWN WINCH ASSEMBLY FOR MOUNTING UPON A POWER DRIVEN VEHICLE WHEEL

BACKGROUND OF THE INVENTION

Persons who do a substantial amount of driving in snow, sand or muddy conditions will frequently equip their vehicle with a permanently mounted power driven winch, or in other cases, will carry a hand powered winch assembly which can be anchored to some fixed object to draw the vehicle from a stuck position. However, the vehicle-mounted power driven winches and the hand winches referred to above are quite expensive and are not economically justified for the average person.

While various examples of detachable winch assemblies for mounting upon a vehicle wheel are found in the prior art, these assemblies typically employ a relatively heavy cylindrical drum which is attached by some type of adaptor assembly to a power driven vehicle wheel. See, for example, U. S. Pat. Nos. 944,956; 1,495,225, 3,099,416, 3,292,905, and 3,392,961. While these latter patents disclose winch appliances which are less expensive than the self-powered or hand powered winch assemblies referred to above, they all involve a relatively heavy and rigid winch drum, together with, in some cases, a fairly complex adaptor assembly for mounting the drum on the wheel.

The present invention is especially directed to a winch attachment assembly which can be readily mounted upon a vehicle wheel and which consists of a relatively small number of relatively small components which are be compactly stored when not in use and which can be manufactured at a very low price.

The present invention may be used to winch a stuck vehicle free and may also be used to lift or draw loads by jacking up the wheel upon which the winch is mounted.

SUMMARY OF THE INVENTION

The winch attachment assembly of the present invention is made up of two or more rigid rod members threaded at one end either internally or externally in correspondence to vehicle wheel mounting nuts or bolts. Preferably, a bar-like handle is welded to the opposite end of the rod member to assist in threading the rod member onto or off of a wheel mounting and to retain a winch cable against sliding axially off the end of the rod member. Longitudinally adjustable struts consisting of two end members and an axially elongate nut or coupling are also employed. The end members are provided at one end with a sleeve which slidably receives a rod member. One of the end members is externally threaded into the elongate nut, the other end member is provided with a shoulder and axially projecting smooth stud which is rotatably received within the other end of the elongate nut.

The assembly is mounted upon a vehicle wheel by removing two or more of the vehicle wheel retainer nuts (or bolts) and threading a rod member onto the vehicle wheel in place of the nuts (or bolts) which have been removed. The rod members are tightened down onto the wheel, and serve to retain the vehicle wheel in the same fashion as did the retaining nuts (or bolts). The strut is slid to the outer ends of the two rod members after they have been mounted on the wheel and the nut is manipulated to adjust the length of the strut to brace the two rod members in parallel relationship to each other. In some cases a second strut is mounted between the rod members to achieve a more rigid assembly. A winch cable is secured to one of the two rod members and, upon power driven rotation of the vehicle wheel, the cable is wound about the two rod members, which act as a reel.

While a minimum of two rod members are necessary for the assembly to act as a reel, three or more rod members may be preferable in order to obtain a stronger assembly and a more even load distribution. Struts are extended between each adjacent pair of rod members where more than two rod members are employed.

Other objects and features of the invention will become apparent by reference to the following specification and to the drawings.

IN THE DRAWINGS

Figure 4:
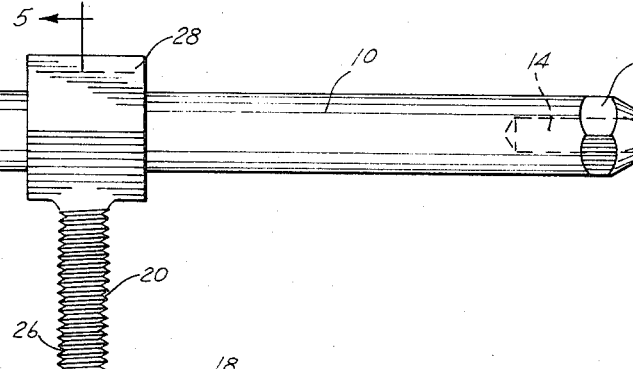
FIG. 4 is a detailed side elevational view of the winch assembly per se.
Figure 5:
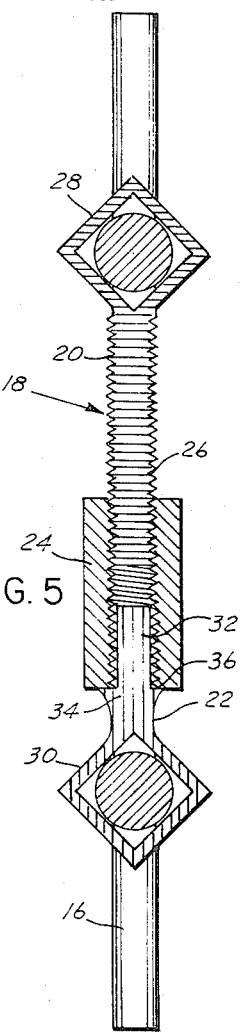
FIG. 5 is a cross sectional view taken on line 5—5 of FIG. 4.

Referring first to FIGS. 4 and 5, one winch attachment assembly embodying the present invention includes a pair of rigid rod members 10 which may conveniently take the form of a 6 inch to 12 inch length of three-fourths inch solid rod stock. In the case where the vehicle wheel is mounted upon projecting studs by retainer nuts, a standard vehicle wheel retainer nut 12 may be welded to one end of each rod member 10. Preferably, before wleding nuts 12 in place, a short bore 14 is drilled coaxially into the end of rod member 10 slightly oversize from the internal threads of nut 12 so that a vehicle wheel mounting stud upon which nut 12 is threaded may project slightly into the end of bore 14. Alternatively, a tapped bore is machined into the rod end threaded to match the vehicle wheel stud. Handles 16 of rod stock are welded to the opposite end of each rod member 10 to provide leverage for threading nuts 12 tightly onto a vehicle wheel mounting stud and also to retain a winch cable from sliding off the end of the rod.

A three element strut assembly generally designated 18 includes first and second end members 20 and 22 and an axially elongated internally threaded nut 24. End member 20 is formed with an elongate shank 26 which is externally threaded to match the threads of nut 24. A sleeve 28, preferably of square tubular cross section, is fixedly welded to one end of shank 26 and is slidably received on one of rod members 10. End member 22 includes a similar sleeve 30 slidably received upon the other rod member 10 to which a pin 32 is fixedly secured as by an enlarged weldment 34 formed with a shoulder 36 against which one end of nut 24 may be seated. Pin 32 has a diameter less than that of the internal threads of nut 24 and is slidably received within one end of nut 24 as best shown in FIG. 5.

Figure 2:
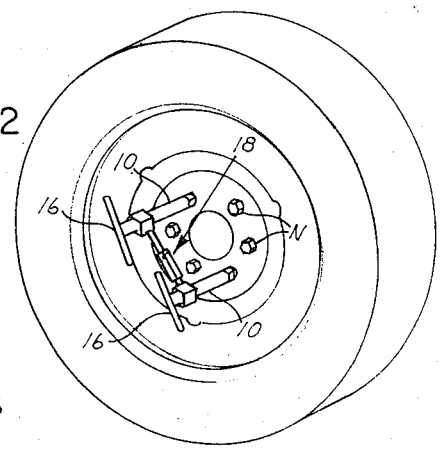
FIG. 2 is a perspective view of a vehicle wheel showing a winch assembly of the present invention mounted upon the wheel.

To install the assembly upon a vehicle wheel, two vehicle wheel retaining nuts N (FIG. 2) are removed from the vehicle wheel mounting studs. The two nuts which are removed are preferably from diametrically opposed positions on the wheel or as close to diametrically opposed positions as can be achieved in thecase of vehicle wheels employing an odd number of wheel mounting studs. End members 20 and 22 are slipped onto the respective two rod members 10 and the rod members are then attached to the wheel mounting studs from which the two vehicle wheel retaining nuts N have been removed. Handles 16 enable the nuts 12 of rod members 10 to be tightened down firmly onto the wheel mounting studs to in effect replace the original wheel mounting nuts N in their wheel retaining function.

Figure 1:
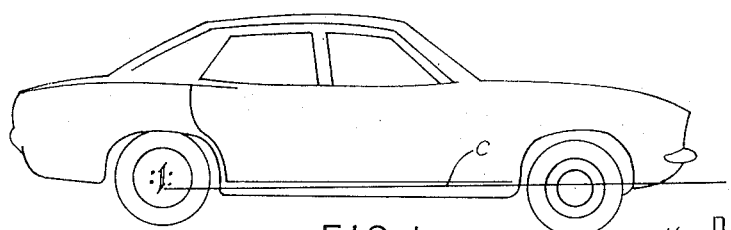
FIG. 1 is a side elevational view of a vehicle showing the winch assembly of the present invention in use.
Figure 3:
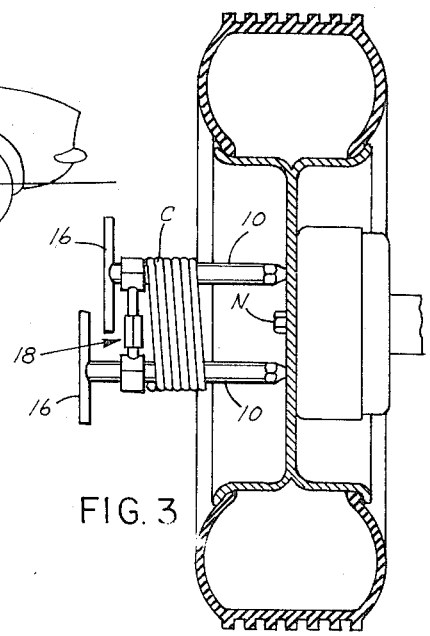
FIG. 3 is a cross sectional view of the vehicle wheel of FIG. 2.

Nut 24 is then seated on pin 32 of end member 22 and the nut is vertically adjusted on threaded shank 26 of end member 20 to lengthen the strut until it is in slight compression between the two rod members 10. One end of a winch cable C is then attached to one of the two rod members 10 and its opposite end is anchored to a fixed object such as a post or tree, not shown. When the vehicle wheel is driven in rotation, the cable C is wound up about the two rod members 10, as shown in FIG. 3 to draw the vehicle toward the fixed object to which the cable C is anchored.

In the drawings, the two rod members 10 are shown as being of different length to avoid interference between the two handles 16 during application to or removal from the vehicle wheel. This feature is of concern primarily in those cases where the bolt circle of the vehicle wheel mounting studs is of relatively small diameter. In most standard sized American automobiles, the vehicle wheel stud bolt circle diameter is large enough so that interference between handles 16 during installation does not occur in which case the rod members 10 may be of the same length.

In the case where the vehicle wheel is mounted by mounting bolts threaded into tapped bores in the wheel mounting member, rod members 10 are formed with an external thread and shoulder conformed to the wheel mounting bolt dimensions.

While the example of the invention shown in the drawings employs only two rod members 10 and a single strut 18, a somewhat more stable assembly can be achieved by using three rod members 10 and three struts 18, the three struts 18 extending between adjacent rod members 10. The primary purpose of strut 18 is to assist in bracing that rod member 10 against which the tension of cable C is being applied as the wheel rotates. The cable C will, at all times when it is under tension, apply a radially compressive force tending to urge the outer ends of the two rod member 10 toward each other, and this radially compressive force is resisted by strut 18.

Where two rod members 10 are employed, and the winch cable extends horizontally from the assembly to a fixed anchorage point, the forces of the cable act on the assembly in a variable manner, depending upon the rotative position of the wheel. When the wheel is in a rotative position such that the two rod members 10 are horizontally aligned with each other, the force exerted by the cable on that rod member 10 remote from the cable anchorage point ends to bend this last-mentioned rod member 10 toward the other rod member. This bending force is partially absorbed and transmitted by strut 18 to the rod member nearest the point of anchorage. However, when the wheel has rotated 90° from this position, the two rod members are vertically aligned with each other and the cable tension is applied primarily to one rod member at right angles to the strut. Where high cable tensions are encountered, three struts achieve a more uniform load distribution.

An assembly including two rod members 10 and a single strut 18 as shown in the drawings has been found effective and operable to winch, for example, a standard American passenger car from a mudhole. Some care is required, where only two rod members 10 are employed, to employ a fairly smooth and steady aplication of power to the wheel on which the winch assembly is mounted. Where extremely high cable tensions will be used, as, for example, an uphill pull through heavy snow, the employment of a third rod member 10 and additional struts 18 on a single wheel or the employment of two rod members 10 on two power driven vehicle wheels would be preferred.

It should be pointed out that in order for the device to function, the winch assembly must be mounted upon a wheel which is free to turn and thus, in the case of vehicles with standard rear differentials, the attachment should be mounted on that wheel which has lost traction. Some vehicles, principally older model automobiles, have both right-hand and left-hand threads on the lug bolts depending upon the side of the vehicle. To accommodate the present winch assembly for use with such vehicles, an internally threaded nut may be secured at each end of the rod member, one of the nuts having a right-hand thread and the other having a left-hand thread. Appropriate handle means may then be included for tightening the rod and nut onto the vehicle wheel mounting stud. Alternatively, a rod member 10 may be provided with an internally threaded nut 12 at one or both ends. The rod may be readily screwed onto a vehicle wheel mounting stud. A bracing strut assembly may be utilized which in addition to bracing two of the rods apart, may also include outwardly extending portions which serve to prevent a rope from slipping off of the winch assembly. Various other modifications and alternative constructions may be utilized within the spirit and scope of the present invention.

While exemplary embodiments of the invention have been described, it will be apparent to those skilled in the art that the described embodiments may be modified. Therefore, the foregoing description is to be considered exemplary rather than limiting, and the true scope ofthe invention is that defined by the following claims.

I claim:

1. For use in combination with a power driven vehicle wheel assembly having a plurality of detachable threaded wheel securing fastener means disposed symmetrically about the wheel axis; a winch attachment assembly for constructing a wheel mounted reel upon which a cable may be wound upon rotation of the wheel comprising a plurality of elongate rigid rod members each having thread means at one end thereof corresponding to those of the wheel fastener means whereby each of said rod members may be mounted upon said wheel assembly in axially projecting relationship thereto in place of a wheel fastener means, elongate bracing strut means, mounting means at each end of said strut means for mounting the strut means upon and extending between adjacent rod members in perpendicular relationship thereto, and adjustment means for adjusting the length of said strut means to brace said rod members in axially extending relationship to said wheel.

2. The invention defined in claim 1 further comprising a handle mounted upon the other end of each rod member in perpendicular relationship thereto.

3. The invention as defined in claim 1 wherein said strut means comprises first and second end members slidably received upon the respective rod members, and threaded coupling means coupling said end members in end to end relationship with each other and operable to vary the lengths of said strut means.

4. The invention defined in claim 3 wherein said first and second end members each comprise a shank portion, and a sleeve fixedly mounted on one end of said shank portion for slidably receiving a rod member and locating the shank portion in perpendicular relationship to the rod member.

* * * * *